US012078984B2

(12) United States Patent
Buerger et al.

(10) Patent No.: US 12,078,984 B2
(45) Date of Patent: Sep. 3, 2024

(54) SAFEGUARDING RESOURCES OF PHYSICAL ENTITIES IN A SHARED ENVIRONMENT

(71) Applicant: Robert Bosch GmbH, Stuttgart (DE)

(72) Inventors: Mathias Buerger, Stuttgart (DE); Meng Guo, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 719 days.

(21) Appl. No.: 17/273,129

(22) PCT Filed: Feb. 11, 2020

(86) PCT No.: PCT/IB2020/051045
§ 371 (c)(1),
(2) Date: Mar. 3, 2021

(87) PCT Pub. No.: WO2020/165739
PCT Pub. Date: Aug. 20, 2020

(65) Prior Publication Data
US 2021/0325862 A1 Oct. 21, 2021

(30) Foreign Application Priority Data
Feb. 13, 2019 (EP) .................................... 19156911

(51) Int. Cl.
*G05B 19/418* (2006.01)
*G06N 3/08* (2023.01)

(52) U.S. Cl.
CPC ... *G05B 19/41895* (2013.01); *G05B 19/4183* (2013.01); *G05B 19/41865* (2013.01); *G06N 3/08* (2013.01)

(58) Field of Classification Search
CPC .......... G05B 19/41895; G05B 19/4183; G05B 19/41865; G06N 3/08
See application file for complete search history.

(56) References Cited

U.S. PATENT DOCUMENTS 6,064,180 A * 5/2000 Sullivan .................. B60L 58/10
320/132
6,498,454 B1 12/2002 Pinlam et al.
(Continued)

FOREIGN PATENT DOCUMENTS

CN 106970831 A 7/2017
CN 107077436 A 8/2017
(Continued)

OTHER PUBLICATIONS

International Search Report for PCT/IB2020/051045, Issued Mar. 13, 2020.
(Continued)

*Primary Examiner* — Daniel Samwel
(74) *Attorney, Agent, or Firm* — NORTON ROSE FULBRIGHT US LLP; Gerard A. Messina

(57) ABSTRACT

A control system and a control method for controlling physical entities to complete tasks within a shared environment. Use is made of a trained resource safety model to predict whether future resource levels of the physical entities satisfy a safe resource level condition, such as a minimum resource level, given previous resource levels and a selection of behaviours for the physical entities. If a respective physical entity is predicted to have a future resource level which does not satisfy the safe resource level condition, the selected behaviour may be modified or replaced, for example by a behaviour which is predicted by the resource safety model to satisfy the safe resource level condition.

14 Claims, 5 Drawing Sheets

(56) References Cited

U.S. PATENT DOCUMENTS

| | | | |
|---|---|---|---|
| 9,397,518 B1* | 7/2016 | Theobald | B60L 53/32 |
| 9,796,091 B1* | 10/2017 | Soo | G06Q 10/1095 |
| 9,821,455 B1* | 11/2017 | Bareddy | H04N 7/15 |
| 2004/0010592 A1 | 1/2004 | Carver et al. | |
| 2008/0109114 A1 | 5/2008 | Orita et al. | |
| 2009/0259363 A1* | 10/2009 | Li | B60W 50/0097 |
| | | | 180/65.265 |
| 2017/0158431 A1* | 6/2017 | Hamilton | G05B 19/41895 |
| 2018/0089563 A1* | 3/2018 | Redding | G06N 7/01 |
| 2018/0095140 A1* | 4/2018 | Park | G01R 31/367 |
| 2018/0336158 A1 | 11/2018 | Iyer et al. | |
| 2019/0102678 A1* | 4/2019 | Chang | G06F 17/18 |
| 2019/0369625 A1* | 12/2019 | Chen | G05D 1/0297 |
| 2020/0164763 A1* | 5/2020 | Holme | B60L 58/21 |
| 2020/0218270 A1* | 7/2020 | Gu | G08G 5/0069 |
| 2020/0223451 A1* | 7/2020 | Shashua | B60W 60/00274 |
| 2021/0116511 A1* | 4/2021 | Tajima | G01R 31/3842 |

FOREIGN PATENT DOCUMENTS

| | | | |
|---|---|---|---|
| CN | 107590000 A | | 1/2018 |
| CN | 108490959 A | | 9/2018 |
| WO | 2016182674 A1 | | 11/2016 |
| WO | 2016210156 A1 | | 12/2016 |
| WO | 2017070330 A1 | | 4/2017 |

OTHER PUBLICATIONS

Kulkarni, T. D. et al., "Hierarchical Deep Reinforcement Learning: Integrating Temporal Abstraction and Intrinsic Motivation," Advances in Neural Information Processing Systems, 2016, pp. 1-9. <https://dl.acm.org/doi/pdf/10.5555/3157382.3157509> Downloaded Mar. 1, 2021.

Gerkey, B. P. et al., "A Formal Analysis and Taxonomy of Task Allocation in Multi-Robot Systems," International Journal of Robotics Research, 23(9):939-954, 2004, pp. 1-18. <http://robotics.stanford.edu/~gerkey/research/final_papers/mrta-taxonomy.pdf> Downloaded Mar. 1, 2021.

Silver, D. et al., "Mastering the Game of Go Without Human Knowledge," Nature, 2017, pp. 1-42. <https://discovery.ucl.ac.uk/id/eprint/10045895/1/agz_unformatted_nature.pdf> Downloaded Mar. 1, 2021.

* cited by examiner

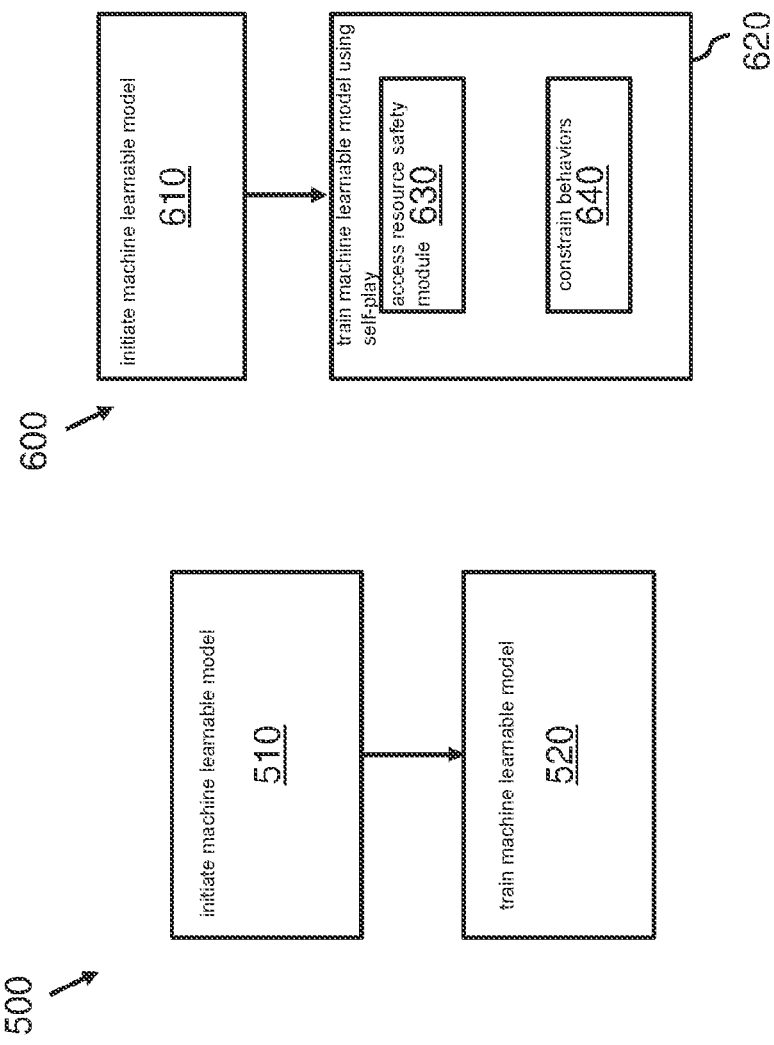

SAFEGUARDING RESOURCES OF PHYSICAL ENTITIES IN A SHARED ENVIRONMENT

FIELD

The present invention relates to a control system and computer-implemented method for controlling physical entities to complete tasks within a shared environment. The present invention further relates to a physical entity. The present invention further relates to a resource safety model for safeguarding resource levels of the physical entities, and to a task selection model for the physical entities. The present invention further relates to a computer-implemented method for training the resource safety model, and to a computer-implemented method for training the task selection model.

BACKGROUND INFORMATION

Conventionally, physical entities may be controlled to complete tasks within a shared environment. For example, warehouse robots may be controlled to complete pick-and-drop tasks in a warehouse. Another example is that autonomous vehicles may be controlled to pick up and drop off passengers within an urban environment.

The physical entities may each have a resource which is consumed during completion of tasks, while the shared environment may comprise one or more resupply points for the physical entities to resupply their resource. The resupply points may be shared, in that each physical entity may in principle use each of the resupply points. In many cases, there may also be fewer resupply points than physical entities. For example, warehouse robots may operate on battery, and the shared environment may comprise one or more battery chargers for the warehouse robots to recharge. Another example is that industrial robots may consume a material during a manufacturing process, such as a filler metal during welding, and the shared environment may comprise one or more resupply point for the material.

Such a system of physical entities may be considered as a multi-agent system, in which each physical entity is represented by an agent. Such agents, which may also be referred to as 'intelligent agents', may in general be defined as autonomous entities that observe and act in an environment in order to reach a certain goal. In the following, any reference to term 'agent' is to be understood as equally referring to a corresponding physical entity, unless otherwise noted.

Proper coordination and collaboration between agents may significantly improve the overall performance of a multi-agent system. This concept is also known as multi-agent planning. However, the agents may be competitive with respect to the shared resources within their environment, e.g., the resupply point(s), as these may be essential for the agent's operational safety, e.g., its battery level. Such shared resupply points may therefore represent hard constraints in the multi-agent planning, which may impose direct dependencies among the agents and may be difficult to handle in the multi-agent planning.

Most multi-agent planning problems, even under discrete and deterministic settings, are generally NP-hard and to suffer from an exponentially-increasing state/action space along with the number of agents. Multi-agent planning problems have therefore been mostly tackled by designing heuristic rules and tuning parameters via extensive testing. For specific domains, conventionally, such as vehicle routing and job assignments, use optimization tools which typically require accurate and complete models and which are typically limited in their applicability.

SUMMARY

It may be desirable to better control physical entities to complete tasks within a shared environment while safeguarding their resource levels.

In accordance with a first aspect of the present invention, a control system is provided. In accordance with a further aspect of the present invention, a computer-implemented control method is provided. In accordance with a further aspect of the present invention, a physical entity is provided. In accordance with a further aspect of the present invention, a computer-implemented method for training a resource safety model is provided. In accordance with a further aspect of the present invention, a computer-implemented method for training a task selection model is provided. In accordance with a further aspect of the present invention, a computer readable medium is provided.

The above measures provide a control system and a control method which make use of a trained resource safety model to predict whether future resource levels of the physical entities satisfy a safe resource level condition, such as a minimum resource level, given previous resource levels and a selection of behaviors for the physical entities. If a respective physical entity is predicted to have a future resource level which does not satisfy the safe resource level condition, the selected behavior may be modified or replaced, for example by a behavior which is predicted by the resource safety model to satisfy the safe resource level condition.

The behaviors may be selected by respective task selection models, and may in general define sets of actions to be performed by the respective physical entities. The actions may comprise or consist of action primitives, which, within the field of robotics to be simple, are atomic movements that may be combined and sequenced to form more complex behaviours, but also other types of actions. Effectively, the behaviors may represent a hierarchical composition of actions. The task selection models may be stored and evaluated by the control system, or in some embodiments stored and evaluated by a processor subsystem of a respective physical entity and then communicated to the control system.

The above measures have as effect that while the task selection may be decentralized, e.g., governed by a respective task selection model, a central safeguard may be provided for the resource levels of the physical entities in the form of a resource safety model. Such partitioning may be advantageous, as the resupply points may be shared among the physical entities, and thereby the safeguarding of resource levels may not be adequately dealt with on an individual basis. In addition, by using a hierarchical composition of actions in the form of behaviors, the exponential blow-up in state and action space may be avoided.

The resource safety model and the task selection model may each represent trained models, such as deep neural networks. The resource safety model may be trained first, while the task selection model may be trained thereafter using the trained resource safety model to constrain behaviours selected by the task selection model during the training to those which are predicted to safeguard the resource levels, for example using a training which involves so-called self-play.

Optionally, the control system comprises a communication interface for communicating with the physical entities, and the processor subsystem is configured to, if a physical entity is predicted to have a resource level not satisfying the safe resource level condition, signal said modified or replaced behaviour to the physical entity using the communication interface. The control system may make the safeguarding of the resource levels operational by signalling the modified or replaced behaviour to the respective physical entity for execution.

Optionally, the interface is an internal interface of the control system, the data storage further comprises the task selection models, and the processor subsystem is configured to select the behaviours for the physical entities using the respective task selection model. The control system may, in addition to safeguarding the resource levels, also perform the task selection by selecting behaviours for the physical entities using respective task selection model. Such a selected behaviour may then be verified by the resource safety model to be safe, i.e., to satisfy the safe resource level condition, before communicating the selected behaviour to the respective physical entity. If a selected behaviour is determined to be unsafe, the selected behavior may be modified or replaced before being communicated, for example by a behavior which is predicted by the resource safety model to be safe.

Optionally, the resource safety model is a trained deep neural network, and the processor subsystem is configured to obtain the prediction of the resource levels of the physical entities using the resource safety model by:
- determining a system state comprising at least part of a state of the physical entities and at least part of a state of the shared environment;
- encoding the system state as an image;
- using the image as input to one or more convolutional layers of the deep neural network;
- using the previous resource vector as input to a fully-connected layer of the deep neural network;
- concatenating outputs of the one or more convolutional layers and the fully-connected layer; and
- using said concatenated outputs as input to a further fully-connected layer of the deep neural network.

The resource safety model, and in some embodiments also the task selection model, may be a deep neural network comprising convolution layers. Such a deep neural network may be trained using the system state as input. The system state may comprise at least part of a state of the physical entities, for example representing the respective positions of the physical entities. Additionally or alternatively, the system state may comprise at least part of a state of the shared environment, for example representing the locations of obstacles and the locations and/or availability of resupply points in the environment. The system state may be specifically provided as an image, which may be may be efficiently processed by convolutional layers of the deep neural network. In some embodiments, the image may comprise an image of the environment, e.g., as acquired by a camera. In other embodiments, the image may be synthetically generated by encoding state information as image data, e.g., as R, G, and/or B values in case of an RGB image. In some embodiments, the image may comprise an image of the environment and encoded other state information. For example, the R channel of the RGB image may comprise intensity values of an image of the environment, while the G and/or B channel of the RGB image may comprise encoded metadata. The resource vector, which may in some cases be a 1-dimensional vector, may be efficiently processed by a fully-connected layer of the deep neural network. By concatenating the outputs of said layers and using them as input to a further fully-connected layer of the deep neural network, an output is obtained for the deep neural network.

Optionally, the resource is an energy resource for powering the physical entity, or a material used by the physical entity in a manufacturing process.

Optionally, the physical entity is a robotic system, and the environment is a shared workspace of the robotic systems. Optionally, the physical entity is an autonomous vehicle, and the environment is a shared operating area of the autonomous vehicles. An example of a shared workspace of robotic systems is a warehouse or a factory. An example of a shared operating area of autonomous vehicles is a city road network. In general, the physical entity may be (semi-) autonomous, in that it is not operated by human operators, e.g., it may be driverless.

Optionally, the training of the resource safety model comprises making the resource safety model invariant to specific types of task behaviours by, before or during the training of the machine learnable model, replacing the specific types of task behaviours by a generic task behaviour. Thereby, the trained resource safety model is more flexible with respect to the behaviours, which may vary in specification across applications, e.g., due to domain specificity, or for various other reasons.

It will be appreciated by those skilled in the art (in view of the disclosure herein) that two or more of the above-mentioned embodiments, implementations, and/or optional aspects of the present invention may be combined in any way deemed useful.

Modifications and variations of any method, computer-readable medium and/or physical entity, which correspond to the described modifications and variations of the control system, can be carried out by a person skilled in the art on the basis of the present description, and vice versa.

REFERENCES

[1] Kulkarni, T. D. et al. *Hierarchical deep reinforcement learning: Integrating temporal abstraction and intrinsic motivation*. In Advances in neural information processing systems, pp. 3675-3683, 2016
[2] Gerkey, B. P. et al. *A formal analysis and taxonomy of task allocation in multi-robot systems*. The International Journal of Robotics Research, 23(9):939-954, 2004
[3] Silver, D. et al. Mastering the game of go without human knowledge. Nature, 550(7676):354, 2017

BRIEF DESCRIPTION OF THE DRAWINGS

The foregoing and other aspects of the present invention will be apparent from and elucidated further with reference to the example embodiments described by way of example in the description below and with reference to the figures.

FIG. 5 shows a method for training a resource safety model, in accordance with an example embodiment of the present invention.

FIG. 6 shows a method for training a task selection model, in accordance with an example embodiment of the present invention.

FIG. 7 shows a computer-readable medium comprising data, in accordance with an example embodiment of the present invention.

It should be noted that the figures are purely diagrammatic and not drawn to scale. In the figures, elements which correspond to elements already described may have the same reference numerals.

LIST OF REFERENCE NUMBERS

Figure 1:
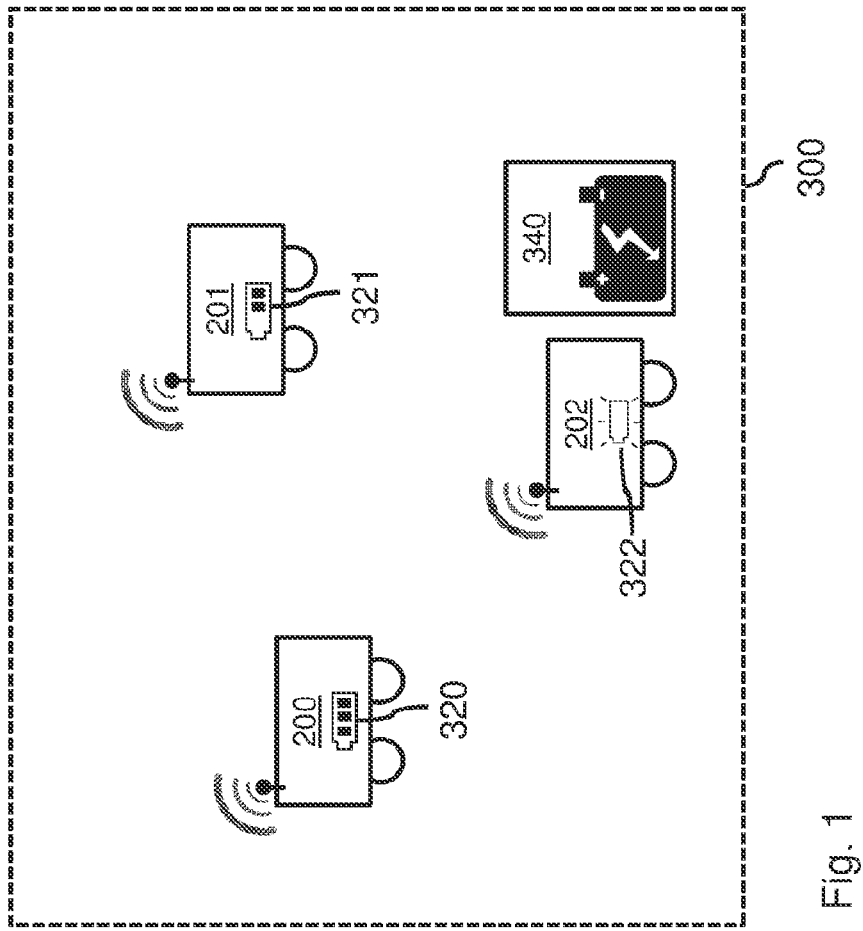
FIG. 1 shows a control system for controlling physical entities to complete tasks within a shared environment, wherein the control system is configured to execute respective task selection models for task selection for each of the physical entities, and a resource safety model for safeguarding the resource levels of the physical entities, in accordance with an example embodiment of the present invention.
Figure 1:
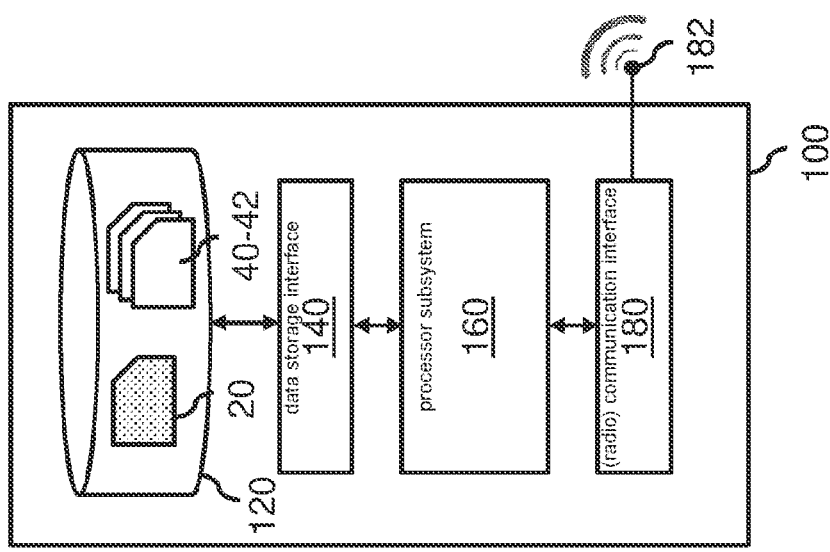

The following list of reference numbers is provided for facilitating the interpretation of the figures and shall not be construed as limiting the present invention.

| | |
|---|---|
| 20 | resource safety model |
| 40-42 | task selection models |
| 100 | control system |
| 120, 122 | data storage |
| 140 | data storage interface |
| 160, 162 | processor subsystem |
| 180 | (radio) communication interface |
| 182 | (radio) communication |
| 200-203 | physical entity (robot) |
| 220 | data storage |
| 240 | data storage interface |
| 260 | processor subsystem |
| 280 | (radio) communication interface |
| 282 | (radio) communication |
| 300, 301 | environment (workspace) |
| 310-315 | shelves |
| 320-322 | resource level |
| 330, 331 | movement trajectory associated with task behaviour |
| 332 | movement trajectory associated with resource behaviour |
| 340 | resupply point |
| 400 | resource safety model |
| 450-452 | task selection model |
| 500 | method of training resource safety model |
| 510 | initiating machine learnable model |
| 520 | training machine learnable model |
| 600 | method of training task selection model |
| 610 | initiating machine learnable model |
| 620 | training machine learnable model using self-play |
| 630 | accessing resource safety model |
| 640 | constraining behaviours using resource safety model |
| 700 | computer-readable medium |
| 710 | non-transitory data |

DETAILED DESCRIPTION OF EXAMPLE EMBODIMENTS

The following relates to a dynamic scheduling for physical entities which may operate autonomously or semi-autonomously within a same environment to accomplish a sequence of tasks, while operating under common resource constraints. The tasks may arrive continuously during runtime and may not be known a priori. Furthermore, each physical entity may rely on a local resource to operate, such as a battery, while the level of the resource may decrease over time, e.g., by the resource being consumed during the operation of the physical entity.

The re-supply of the resource, e.g., by means of a battery charging station, may be shared among all physical entities, and may be subject to certain constraints. For example, the resupply points may be provided only in certain locations in the environment, and/or these resupply points may be used by only one physical entity at a time. It may be desirable to address the task assignment problem in such a system, e.g., which physical entity takes which task, and the resource sharing problem, e.g., which physical entity re-supplies its resource at which resupply point, such that the number of accomplished tasks are optimized and the local resources of all physical entities are safeguarded, e.g., not depleted.

A specific example may be a so-called active-shuttle system. Here, autonomous fork-lifts may be used to complete transportation tasks according to online orders, e.g., to transport goods from one shelf to another. All fork-lifts may be powered by battery and the battery is preferably kept above a certain battery level. There may be several charging stations to charge the batteries. Each charging station may be used by only one robot at a time. Here, a scheduling may be desired for the task assignment, e.g., which robot takes which task, and the charging, e.g., which robot charges its battery at which charging station, such that the number of accomplished tasks are maximized and the batteries of all robots are not depleted.

The following relates to the dynamic scheduling for such or similar types of robotic shuttles or fork-lifts, in short also referred to as robots. It will be appreciated, however, that the described measures equally apply to other types of robots or physical entities and other types of resources. For example, the physical entities may be hydrogen-powered autonomous vehicles which may operate as taxis by picking-up and dropping-off passengers, and the resource may be a hydrogen level. Another example is that the physical entities may be manufacturing robots, and the resource may be a material which is consumed during manufacturing, e.g., paint in case of painting robots, or a filler material in case of welding robots.

FIG. 1 shows a control system 100 for controlling physical entities 200-202, being in this example autonomous or semi-autonomous robotic shuttles, to complete tasks within a shared environment 300. In the example of FIG. 1, the shared environment is schematically shown as a bounding box 300, and may denote, for example a warehouse's interior. In addition, the physical entities 200-202 are shown with their resource level 320-322, being in this example a battery level. The shared environment is further shown to comprise a battery charger 340.

The control of the physical entities 200-202 by the control system 100 may be based on respective task selection models which may be provided for each of the physical entities 200-202, and a resource safety model for safeguarding resource levels of the physical entities. The task selection models may also be referred to as 'decentralized' task selection models since a separate task selection model may be provided for each of the physical entities, and the resource safety model may also be referred to as a 'centralized' resource safety model since one resource safety model may be provided.

In general, the behaviour selection for the physical entities may be performed by different types of task selection models. For example, such task selection models may be adapted to a type of physical entity, or to a type of tasks to be performed. Alternatively, the behaviour selection may be performed by instances of a same task selection model, for example if the physical entities are homogenous in type and/or type of tasks to be performed.

By way of example, the following considers the task selection models to be instances of a same task selection model, but may also apply to different types of task selection models, mutatis mutandis, unless otherwise noted.

The control system 100 is shown to comprise a data storage 120 which comprises data representing the resource safety model 20 and the instances 40-42 of the task selection model. For example, each of the models 20, 40-42 may be stored in the data storage 120 as a respective file or respective part of a file. Each instance 40-42 of the task selection model may be associated with a particular physical entity. For example, a first instance 40 of the task selection model may be associated with a first physical entity 200, a second instance 41 of the task selection model may be associated with a second physical entity 201 and a third instance 42 of the task selection model may be associated with a third physical entity 202.

The resource safety model and the task selection model may each be a trained model. As also explained in more detail with reference to FIG. 4, the task selection model may be trained to select a behaviour for the respective physical entity from a set of behaviours which comprises resource behaviours associated with resupplying the resource and task behaviours associated with selecting and/or completing tasks from a shared task list. The behaviours themselves are further discussed with reference to the heading 'Hierarchical composition of actions', but in general may each define a set of actions to be performed by the respective physical entity. Such actions may comprise or consist of so-called action primitives, within the field of robotics to be simple, are atomic movements that may be combined and sequenced to form more complex behaviours. In general, however, any actions, e.g., 'simple' or not, may be grouped as a behaviour. Inherently, the behaviour may thereby be more complex than each individual action.

As also explained with reference to FIG. 4, the resource safety model may be trained to provide a resource vector representing a prediction of resource levels of the physical entities at a select time instant. During training, but also during subsequent use, the resource safety model may use as input a previous resource vector representing the resource levels of the physical entities at a time instant which precedes the select time instant, and the behaviour selected for each of the physical entities. In some embodiments, the resource safety model may use a history of such resource vectors as input, and/or a history of selected behaviours. In some embodiments, the resource safety model may use a system state as input. The system state, which may be referred to as system operation state, may comprise at least part of a state of the physical entities and at least part of a state of the shared environment. In some embodiments, a history of system states may be used.

The control system 100 is further shown to comprise a data storage interface 140 for accessing the data storage 120. The data storage 120 itself may be or may comprise a volatile or non-volatile memory, a solid-state disk, a hard disk, or an array of such data storage means, etc. The data storage interface 140 may be a corresponding type of interface providing access to the data storage 120. In some embodiments, the data storage 120 may be an external data storage, in which case the data storage interface 140 maybe an external interface, e.g., a network interface.

The control system 100 is further shown to comprise a processor subsystem 160 which may be configured to, during operation of the control system 100, obtain a selection of the behaviours for the physical entities from the respective instances 40-42 of the task selection model. For that purpose, the processor subsystem 160 may be configured to evaluate each instance 40-42 of the task selection model, for example using input as described with reference to FIG. 4. Having obtained the selection of behaviours, the processor subsystem 160 may obtain a prediction of the resource levels of the physical entities 200-202 at the select time instant using the resource safety model 20, determine whether the resource levels 320-322 of the physical entities are each predicted to satisfy a safe resource level criterion, and for a respective physical entity which is predicted to have a resource level which does not satisfy said criterion, modify or replace the behaviour selected for the respective physical entity to safeguard the resource level.

In the example of FIG. 1, this may comprise the control system selecting a resource behaviour which causes the physical entity 202 to recharge at the battery charger 340 as its battery level 322 is low and may be predicted to be fully depleted, or at least to drop below a battery level which is considered safe, if the behaviour selected by the task selection model 42 is executed. Alternatively, the task selection model 42 itself may select the corresponding resource behaviour, e.g., without the processor subsystem 160 having to override a behaviour selection by the task selection model 42 on the basis of the output of the resource safety model.

The control system 100 is further shown to comprise a communication interface 180, being in the example of FIG. 1 a radio-based communication interface. In the example of FIG. 1, the processor subsystem 160 may generally communicate behaviours selected by the instances 40-42 of the task selection model to the respective physical entities 200-202 using the communication interface 180, and specifically using radio communication 182. However, if a behaviour is modified or replaced as a result of the output of the resource safety model 20, the modified or replaced behaviour may be communicated instead of the initially selected behaviour.

Effectively, the trained resource safety model may represent or may be used as a safety policy, and specifically may be used provide a guarantee on the system resource level by avoiding behaviours that would lead the system to an unsafe system state, e.g., in which the resources of one or more physical entities are depleted or below a safe battery level. Here and elsewhere, any reference to 'system' without the prefix 'control' may refer to the system of physical entities rather than the control system, unless otherwise implied. The selective modification or replacement of behaviours may ensure a minimal or at least reduced impact on the task execution, in that the processor subsystem 160 may only intervene in the task execution when necessary, e.g., when the resource level is endangered.

Figure 2:
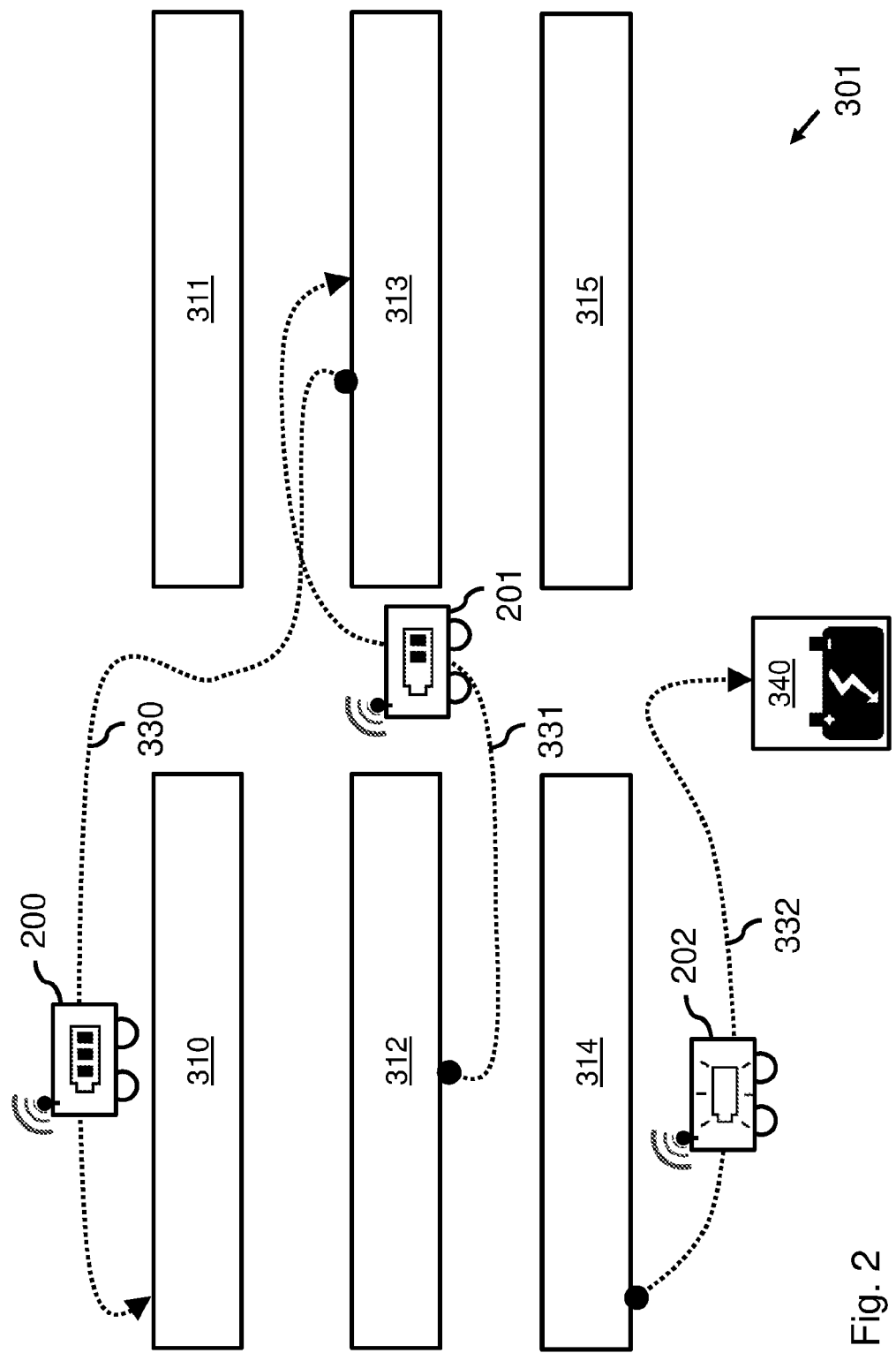
FIG. 2 provides a more detailed view of a shared workspace, in accordance with an example embodiment of the present invention.

FIG. 2 shows an example of a shared workspace 301 which comprises shelves 310-315 and in which robots 200-202 execute tasks which may involve picking-up and dropping-off products in respective shelves. The task execution may be based on a selection of tasks behaviours. A task behaviour may define a set of actions which causes a respective robot to pick up a product at a source location, move along a movement trajectory to a destination location, and drop off the product at the destination location. FIG. 2 shows the movement trajectories 330, 331 of the robots 200,

201 which are executing a task behaviour. Further shown is a robot 202 of which the battery is nearly depleted, and which is assigned a resource behaviour which may cause the robot 202 to move along a movement trajectory 332 to a battery charger 340 and to recharge at the battery charger 340. Such a resource behaviour may be assigned by the instance of the task selection model of the respective robot 202, but also by a resource safety model which may have modified or replaced a task behaviour which was initially selected for the robot 202.

In general, the resource safety model and the instances of the task selection model may be executed by a single entity, e.g., by the control system 100, but may also be executed in a distributed manner, e.g., using different entities.

Figure 3:
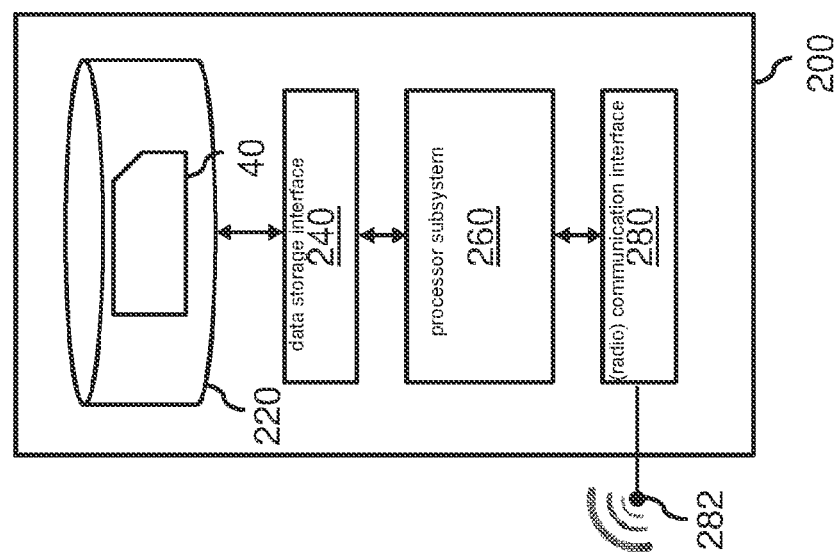
FIG. 3 shows a control system which receives selected behaviours from a task selection model executed by a processor subsystem of a respective physical entity, wherein the control system is configured to execute a resource safety model while using the selected behaviours as input to the resource safety model, in accordance with an example embodiment of the present invention.
Figure 3:
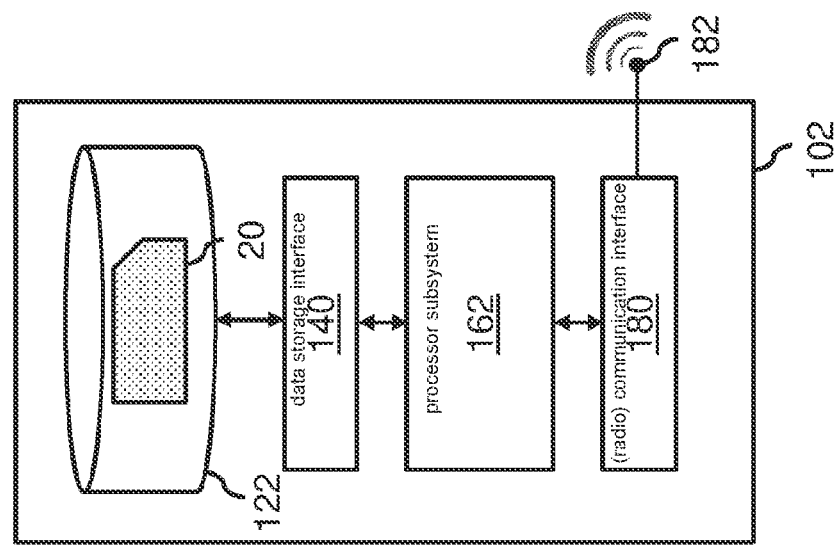

FIG. 3 shows an example of the latter, in that it shows a control system 102 which stores the resource safety model 20 and one of the physical entities 200 which stores an instance of the task selection model. The physical entity 200 as shown and described may be exemplary for the other physical entities in the shared environment (not shown in FIG. 3). The physical entity 200 may be configured to execute the instance of the task selection model to obtain a behaviour selection. For that purpose, the physical entity 200 may comprise a data storage 220 storing the data of the instance 40 of the task selection model and a data storage interface 240 for accessing the data storage. The data storage 220 and the data storage interface 240 may be of a same type as the data storage 120 and the data storage interface 140 as described with reference to FIG. 1.

The physical entity 200 is further shown to comprise a processor subsystem 260 and a communication interface 280. The processor subsystem 260 may be configured to select the behaviour using the task selection model, and using the communication interface 280, signal said selected behaviour to the control system 102. If in response another behaviour is received from the control system 102, the processor subsystem 260 may then execute the newly received behaviour instead of the initially selected behaviour.

The control system 102 may be similar to the control system 100 of FIG. 1, except that the data storage 122 may store the resource safety model 20 without having to store the instances of the task selection model. The processor subsystem 162 may now be configured to obtain the task selection via the communication interface 180 from each of the physical entities, and may communicate modified or replaced behaviours to the physical entities. Effectively, whereas the control system 100 of FIG. 1 may perform each behaviour selection for each of the physical entities, the control system 102 may only check the behaviour selection by each of the physical entities against the safety policy. More specifically, the control system 102 may receive the behaviour selection from each of the physical entities via the communication interface 180 and use the behaviour selections as input to the resource safety model 20 to determine whether the behaviours selected by the physical entities cause an unsafe system state, e.g., in which the resource of a physical entity is depleted or below a safe battery level.

In the example of FIG. 3, the communication interfaces 180, 280 of the control system 102 and the physical entity 200 are shown to be radio communication interfaces 180, 280 for radio communication 182, 282 between the control system 102 and the physical entity 200. However, the communication interfaces 180, 280 may also be of any other suitable type, such as a wireless interface such as Wi-Fi, ZigBee, Bluetooth, a mobile interface such as a 4G or 5G mobile interface, etc., or a wired interface such as a fibre-optic interface, an Ethernet interface, etc. The above also applies to the communication interface 180 of the control system 100 of FIG. 1. Various details and aspects of the operation of the control system and the physical entities, for example as previously shown in FIGS. 1 and 3, including optional aspects thereof, will be further elucidated elsewhere in this specification.

In general, the control system may be embodied as, or in, a single device or apparatus, such as a workstation or a server. The server may be an embedded server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the control system may be implemented in the device or apparatus in the form of programmable logic, e.g., as a Field-Programmable Gate Array (FPGA). In general, each functional unit of the control system may be implemented in the form of a circuit. The control system may also be implemented in a distributed manner, e.g., involving different devices or apparatuses, such as distributed servers, e.g., in the form of cloud computing.

Likewise, the physical entity may comprise one or more microprocessors which execute appropriate software. For example, a processor subsystem of the physical entity may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the physical entity may be implemented in the physical entity in the form of programmable logic, e.g., as a Field-Programmable Gate Array (FPGA). In general, each functional unit described for the physical entity may be implemented in the form of a circuit.

The following further refers to the resource safety model and the task selection model. Briefly speaking, the resource safety model may oversee the selection of behaviours for the physical entities by the instances of the task selection model. As also explained further onwards, the resource safety model may use as input the system state, the resource levels of the physical entities, and the behaviours selected for the physical entities. With continued reference to the example of FIG. 2, the system state may for example be represented by an image showing all robots within the workspace, while the resource levels may be represented by a vector containing the battery level of all robots.

The image may comprise acquired image data of the environment. Additionally or alternatively, the image may comprise non-acquired image data representing an encoding of state information as image data, e.g., as R, G and/or B values. The resource safety model may output the predicted resource levels of the physical entities at a future time instant. The future time instant may in some examples be an input parameter of the resource safety model. A behaviour may be determined to be safe if all future predicted resource levels are above a minimum level. If a behaviour is determined to be unsafe, e.g., if the resource level of at least one of the physical entities is predicted to be below a minimum resource level, the behaviour may be modified or replaced by a behaviour that is determined to be safe. As an optimization, within the set of safe behaviours, a behaviour which minimizes the intervention with respect to the initially selected behaviour and which maximizes the effectiveness of the task execution may be considered and selected as an optimal safe behaviour.

Given a safe behaviour, the physical entities may be instructed as follows, e.g., by their local processing subsystem or the processing subsystem of the control system. All physical entities which require resupply of their resource may be instructed to resupply their resource at a resupply point, or to wait for such resupply at their current location, e.g., if there are fewer resupply points than physical entities needing resupply. All physical entities which are allowed to execute task behaviours may be controlled by the respective instance of the task selection model. The task selection model may use as input a local state and task distribution (e.g., as an image) and may determine which task behaviour to select. A particular task behaviour may be associated with a particular task. As such, a selection of a task behaviour may in some embodiments correspond to a selection of a task. A selected behaviour may be executed by executing the respective actions, for example using low-level execution policies such as navigation and primitive action execution.

Figure 4:
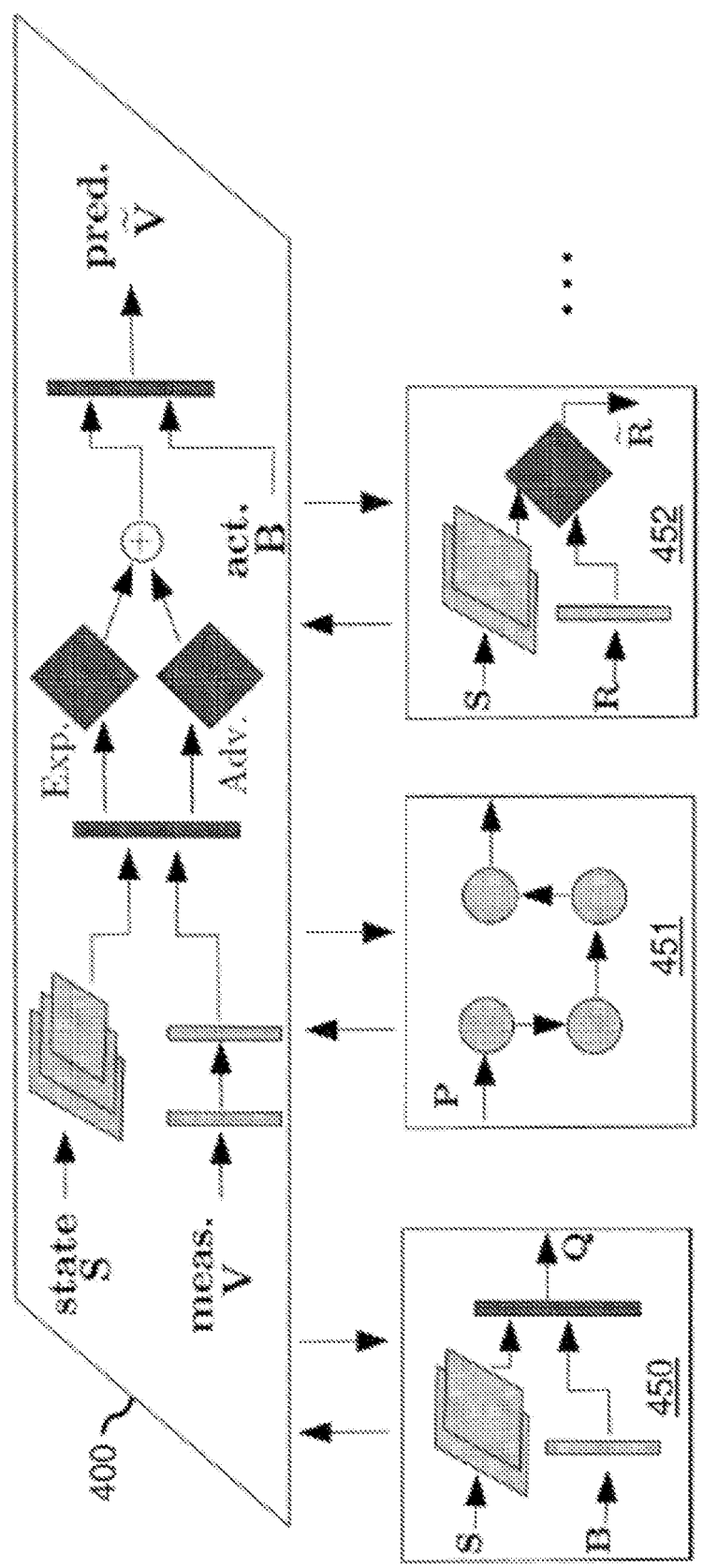
FIG. 4 shows a mathematical representation of the resource safety model and of respective task selection models, in accordance with an example embodiment of the present invention.

FIG. 4 shows a mathematical representation of the resource safety model 400 and of respective task selection models 450-452, which is obtained by considering the control of the physical entities as a multi-agent planning problem. In the following, the resource safety model is also referred to as a predictive safety network from which a safety policy may be derived, and the task selection model is also referred to as a (local) safety guarded task network, or in short a (local) task network, from which a (local) task policy may be derived. Here, 'network' denotes the use of a trained network, such as a (deep) neural network. It is noted that the task selection models 450-452 are shown to be different types of task selection model, but may alternatively also be instances of a same task selection model.

Consider a team of N agents where each agent $n \in \mathcal{N} \triangleq \{1, \ldots, N\}$ is modeled by a conditioned Markov decision process (MDP), denoted by $\mathcal{M}_n = \langle S_n, A_n, C_{-n}, R_n, T_n \rangle$, where $S_n$ is the state space, $A_n$ is the action space, $C_{-n} = \langle S_{-n}, A_{-n} \rangle$ is the set of state-action pairs of other agents, $R_n$: $S_n \times A_n \times C_{-n} \rightarrow \mathbb{R}$ is the reward function, and $T_n$: $S_n \times A_n \times C_{-n} \times S_n \rightarrow [0,1]$ is the transition probability. Note that both the reward function and the transition function may be conditioned on other agents' states and actions. Both functions may be unknown and change over time. For example, the reward of one agent charging at one location may depend on whether any other agent is using it. The system may evolve as an infinite sequence of state-action pairs $\tau = s_0 a_0 s_1 a_1 \ldots$, where $s_t = (s_0, \ldots, s_N)$ and $a_t = (a_0, \ldots, a_N)$ are the joint state and action of all agents at time $t \geq 0$. The reward obtained by agent n at time t is denoted by $r_{n,t}$. For the ease of notation, we denote by $S = \times_{n \in \mathcal{N}} S_n$ and $A = \times_{n \in \mathcal{N}} A_n$.

Furthermore, the state variable $s_n$ of each agent $n \in \mathcal{N}$ contains a resource variable $v_n \in \mathbb{R}$, for which the joint resource is denoted by $v = (v_0, \ldots, v_N)$. The system-wide resource constraint may be considered to be imposed by $$v_t \in \mathcal{V}_{safe}, \forall t \geq 0 \qquad \text{Equation (1)}$$

where $\mathcal{V}_{safe} \subseteq \mathbb{R}^N$ is a static and predefined safety set of resources, and $v_t$ is the resource vector at time $t \geq 0$.

It may be desirable to synthesize (a) a centralized safety policy $\pi_s$: $S \times A \rightarrow [0,1]$ such that the resource constraint above holds if $v_0 \in \mathcal{V}_{safe}$; and (b) a decentralized local task policy $\pi_{p,n}$: $S_n \times C_{-n} \times A_n \rightarrow [0,1]$ such that the expected discounted total reward $\mathbb{E}_{\pi_p, s_0}\{\Sigma_n \Sigma_t \gamma^t r_{n,t}\}$ is maximized, with $0 < \gamma < 1$.

The following describes a hierarchical composition of actions into high-level agent behaviors, and the network structure and the training method of the predictive safety network which ensures that a safety constraint is met. It is then described how different local task policies may be trained together under the supervision of the learned safety policy, such that a collective reward is maximized.

Hierarchical Composition of Actions

An alternative to planning directly on the primitive actions or raw actuation inputs is the use of high-level meta-actions [1], which may be defined as agent behaviors $B_n$. Some behaviors may be relevant to resource management (denoted by $B_{safe,n}$) and others to task completion (denoted by $B_{task,n}$), $\forall n \in \mathcal{N}$. The set of all agent behaviors is given by $B = \cup_n \{B_n\}$.

The behaviors may be designed based on domain knowledge, but may also be generated autonomously. For logistic robots and pick-and-drop tasks in warehouses, behaviors relevant to task completion may be, e.g., "navigation to pick/drop location", "pick" and "drop". At the same time, to maintain battery level, relevant behaviors may be "navigation to the charge station", "wait to charge" and "charge". An execution policy may be constructed for each behavior in conventional ways, for example via Reinforcement Learning (RL) or classic control techniques. To further reduce the planning complexity, higher level of behaviors may be composed by composing existing behaviors using logic relations. For example, the behavior "if any charge station is available, go and charge there. Otherwise, wait" may combine the individual behaviours "navigation to charge station" and "wait/charge". Another behavior "pick up and drop object at the requested locations" may combine the sequence of behaviors "navigation to the pick up/drop location" and "pick up/drop".

Task-Independent Predictive Safety Network

Given the behaviors described above, a predictive safety network may be initialized and trained for the resource constraint defined by Eq. (1). As indicated earlier, the safety network may oversee the system and the current resource levels, and may predict the resource levels at future times for the selected behaviour. From these predictions, a safety policy may be derived which ensures that the resource levels remain remain at a safe level. As also described further onwards, the safety network may be generic as it may be trained independently of the specific characteristics of a task behaviour, e.g., independent on its duration and cost.

Network Structure of the Predictive Safety Network

As depicted in FIG. 4, the predictive safety network 400 with parameter $\theta$ may take as inputs the system state $s_t$ (labeled 'State S') and the resource vector $v_t$ ('meas. V') at time $t \geq 0$, and may output the predicted resource vectors ('pred. $\tilde{V}$') at the chosen future time instants for all agent behaviors in correspondence with:

$$\tilde{V}_{\theta,t}(s_t, v_t) = (\tilde{V}_{\theta,t}^{b_0}, \tilde{V}_{\theta,t}^{b_1}, \ldots, \tilde{V}_{\theta,t}^{b_M}) \qquad \text{Equation (2)}$$

where $\tilde{V}_{\theta,t}^{b_m} = (v_{t+\tau_0}, v_{t+\tau_1}, \ldots, v_{t+\tau_K})$ are the predicted resource vectors at the chosen time shifts $\{\tau_0, \ldots, \tau_K\}$, and $b_0, b_1, \ldots, b_M$ are the allowed behaviors at time t. In this example, the state $s_t$ may be represented as an image and may be processed first by one or several layers of a convolutional neural network (CNN), while the resource $v_t$ may be processed by a fully-connected layer or by several fully-connected layers. These two outputs may then be concatenated as the hidden input representation. To differentiate more different behaviours, this hidden input may be split into the expectation ('Exp.') and advantage ('Adv') branches, which may then summed into the actual predictions. The actual prediction for a selected behavior $b_t$ ('act. B') may be derived by one-hot encoding.

Task-Independent Training of the Predictive Safety Network

The safety network may be trained using supervised learning without extraneous supervision. In particular, the system may start from the initial state $s_0$ and resource vector $v_0$. At step t, the safety network may output $\tilde{V}_{\theta,t}(s_t, v_t)$ as defined in Eq. (2). Note that in order to make the action set $b_t$ invariant to various task specifications, all task-related behaviors may be replaced by a generic behavior, e.g., corresponding to "perform task". The cost and duration of the generic behaviour may be randomly sampled from the original set of actions.

Then the next behavior to execute $b_t$ is chosen as the solution to the following optimization:

$$\min_{\{b \in B\}} \left\{ \sum_n 1_{b_n \in B_{safe,n}} \right\}$$
$$\text{s.t.} \quad d_H(\tilde{V}_{\theta,t}^b, v_{unsafe}) > \delta_{safe}$$

Equation (3)

where the objective may be to minimize the number of behaviors activated for safety (e.g., belong to $B_{safe,n}$), and the constraint may be to ensure the Hausdorff distance between the predicted future resources $\tilde{V}_{\theta,t}^b$ and the unsafe set $\mathcal{V}_{unsafe}$ is above a manually-chosen robustness margin $\delta_{safe} > 0$, where $\mathcal{V}_{unsafe} \triangleq \mathbb{R}^M \setminus \mathcal{V}_{safe}$. The objective above may be defined as a measure of "intervention" and "conservativeness" for the learned safety policy. Smaller interventions may indicate that the safety policy allows more freedom in executing task-related behaviors and is thus less conservative. This aspect may impact the performance of the overall system of agents. For example, a conservative safety policy may be perfectly safe by keeping all agents still but not allowing any progress in task completion. If the optimization defined by Eq. (3) does not provide a solution, then $b_t$ may be chosen as the safest behavior, e.g., with the maximum intervention. If multiple solutions are found, $b_t$ may be chosen randomly.

Once $b_t$ is chosen, the system may evolve to state $s_{t+1}$ and resource $v_{t+1}$. This procedure may be repeated for a number of steps or until the resource vector becomes unsafe. $\mathcal{D}_{safe} = \{\langle s_t, v_t, b_t, V_t \rangle, \forall t\}$ denotes the set of experience, where $V_t$ are the recorded resources at the chosen future instants. The network parameter $\theta$ may be trained via minimizing the regression loss:

$$L(\theta) = \|\tilde{V}_{\theta,t}^{b_t}(s_t, v_t) - V_t\|_2,$$

Equation (4)

where $\langle s_t, v_t, b_t, V_t \rangle$ are sampled from $\mathcal{D}_{safe}$. More experiences may be collected after more episodes are simulated. Then mini-batches may be drawn from the experiences and used to update the network periodically.

The following techniques may be applied during the training: a E-greedy policy may be used to allow the exploration of safety-uncertain behaviors; initial states and resources may be randomized to cover larger part of the state space, especially the unsafe part; the time shifts in Eq. (2) may be critical hyper parameters to be tuned: too long time shifts may introduce large variances in the prediction while too short time shifts may fail to facilitate long-time reasoning; lastly, the training process may be accelerated by creating a population of safety networks as "workers" to generate experiences concurrently.

Safety-Guarded Task Network

Beside maintaining a safe resource level, the agents of the multi-agent system may be assigned tasks to complete. A task network may be provided to efficiently assign these tasks to an individual agent such that more tasks may be accomplished per unit time, under the above-mentioned safety constraints.

Task Description

It may be desirable to handle a continuous stream of tasks that are assigned to the whole system, e.g., according to online orders, instead of a predefined set of static tasks. The completion of a single task may correspond to any sequence of the task-relevant agent behaviors $B_{task,n}$ as introduced above. Such a sequence may be either directly specified by the user or derived by an external planning process, which may for example be based on formal languages and decision trees. Note that the following assumes that any single task in the stream may be accomplished by at least one agent, but including explicit agent collaborations with dependent actions [2] is feasible as well. A reward function is associated with the accomplishment of each task which may decay over time.

Network Structure of the Task Network

Generally speaking, any task network may be used for controlling a single agent to accomplish a given tasks may be used within the overall architecture shown in FIG. 4, e.g., a Q-network or even an explicit task policy such as "always take the closest task", where 'closest' may refer to a proximity-based criterion. Accordingly, FIG. 4 shows different types of task networks 450-452.

The following describes the use of a variation of the predictive safety network as the task network. Since the task network may be applied locally to individual agents, its inputs may only contain the local state and observations. Such observations may include observations of other agents as part of the shared environment and the distribution of existing tasks. For agent n, e.g., as a reward vector $r_t^n$ may be used as input vector, which may include both the local reward and the other agents' rewards. The corresponding reward prediction from the task network is denoted by $\tilde{R}_{\beta,t}^n$, where β is the network parameter.

Training of the Task Network Via Self-Play

To train the task network, so-called self-play techniques [3] may be used. Namely, during such self-play, agents with possibly different task networks may be controlled independently in parallel simulations, while the choice of each agent's behavior may be constrained by the learned safety network as follows:

$$\max_{\{b^n \in B^n\}} \left\{ \sum_n \tilde{R}_{\beta,t}^{b^n} \right\}$$
$$\text{s.t.} \quad d_H(\tilde{V}_{\theta,t}^b, v_{unsafe}) > \delta_{safe}$$

Equation (5)

where $b^n$ is the local behavior of agent n in the task network, b is the joint behavior in the safety network, $\tilde{V}_{\theta,t}^b$ are the predicted resources by the learned safety network, and the safety distance may be defined by Eq. (3). The above constraint may ensure that only the behaviors that are predicted to be safe by the safety network may be chosen for maximizing the collective rewards by the task network. In other words, the training of the task network may be safe-guarded by the predictive safety network. Once the local behaviors are chosen for each agent, the whole system evolves accordingly. Experiences for the task networks may be gathered locally from the agents' local perspectives. These experiences may then be used to train the task networks via minimizing the regression loss, similar to Eq. (4). It is noted that the safety network may also be trained or updated during the training of the task network by gathering more task-specific experiences. This, however, may limit the safety network's generalization to other tasks.

Example Scenario

An example of the use of the above-described resource safety model and task selection model is the following, in which said models have been applied, by way of simulation and evaluation, to address the practical planning problems of an indoor logistic system as previously described with reference to FIG. 3.

In the simulation, the warehouse shared by the robots is partitioned into rectangular cells which may be occupied by shelves, robots or charging stations. In the simulation, a fleet of 5, 8, 10 or 15 robots are considered with 2 charging stations. The robots may be controlled via primitive discrete actions: move into adjacent cells by action "wait" (−0.002), "up" (−0.01), "down" (−0.01), "left" (−0.01), "right" (−0.01); "load" (−0.02) and "unload" (−0.02) objects; and "charge" (0.02) at charging stations. The maximum battery level is set to 1.0 and the battery decrease/increase of performing each action is given in the respective parentheses. Each action is completed within one simulation step. Uncertainties are added to the simulation by assuming (a) the robot can drift sideways with 5% probability when moving to an adjacent cell, and (b) the battery consumption of each action varies by a standard deviation of 10%. Furthermore, the stream of tasks is generated with randomly-chosen loading and unloading locations. The density of this stream may be changed by changing the interval between the generation of new tasks.

Example Implementation Details

The above primitive actions may be hierarchically composed into high-level behaviors.

The point-to-point navigation behavior may be learned via DQN or finding stochastic shortest paths. This navigation behavior may then be grouped and sequenced with manipulation actions into other behaviors. A resource-related behavior may be "if any charge station is available, go and charge there until full. Otherwise, wait at the current location", for when a robot tries to charge. A set of N+1 resource-related behaviors may be obtained: $B_{safe}=\{$"n robots should try to charge", where n=0, 1, . . . , N$\}$. For example, when five robots try to charge, the robot with the lowest battery level is assigned first to the available charging station.

An example of a task-related behaviour is "navigate to load the object, and then navigate to unload it", which may a task-related behavior when a robot executes a plan for a transportation task. A set of task-related behaviors may be obtained: $B_{task}=\{$"robot takes the $n_{th}$ closest task", where n=1, 2, 3$\}$. The available tasks around the robot may be ordered by their relative distances the robot. The robot may choose among the closest three tasks. However, always choosing the closest task may not be collectively optimal as sometimes another robot may be much closer. It is noted that that $B_{safe}$ may grow linearly with the number of robots and $B_{task}$ may be local to each robot having a constant size.

In the learned safety network, the system state may be encoded by an image, e.g., by encoding location of robots, shelves, battery chargers, etc as image data. The resource vector may be a stack of battery level of all robots and may in some embodiments additionally comprise the remaining charging level for each charging station. The resource vector may thus have a size of N+2. The prediction horizon may be set to [5, 10, 20, 40, 80] for the safety network. The safety margin in Eq. (3) may be set 0.1. The exploration rate ε may be initially selected to be 0.2 and to gradually decay with time.

The system state may be processed by two convolution layers with 64 filters and a kernel size of 5. The resource vector may be processed by a fully connected layer of size 512. The concatenated hidden state may be followed by a fully connected layer of size 1024. The set of actions may be defined as above by $B_{safe}$ with size N+1. The expectation and advantage branches may be passed through individual fully connected layers of size $N_{act} \times N_r \times \dim(v_t) = \mathcal{O}(N^2)$. The actual prediction for each robot may be derived by summing these two branches. During the training, 5 workers may be used to gather experience in parallel simulations for the master network. The master network may then be trained via mini-batches of size 500 drawn randomly from the experience buffer. The trained master network may then be used to periodically update the worker network.

For the local task network, the system state may be encoded by an image, e.g., by encoding a location of the robot under consideration, other robots, shelves and a task distribution as image data. The prediction horizon may be set to [2,4,10,20] for all robots. The local reward vector as input may have dimension N and represent the accumulated rewards. The set of actions may be defined above by $B_{task}$ with size 3. The CNN layers may be the same as those of the safety network. The fully-connected layer that summarizes the expectation and advantage branches may now have size $\mathcal{O}(N)$. During training, 5 workers may be used to gather experiences for the master task network. During the current self-play, each robot may be controlled by one randomly-chosen worker and the gathered local experiences may be saved in a shared experience buffer. The master network may then be trained via mini-batches of size 300 drawn randomly from the experience buffer and the workers may be updated periodically by copying the master network.

FIG. 5 shows a block-diagram of a computer-implemented method 500 for training a resource safety model. The method 500 may comprise, in an operation titled "INITIATING MACHINE LEARNABLE MODEL", initiating 510 a machine learnable model, and in an operation titled "TRAINING MACHINE LEARNABLE MODEL", training 520 the machine learnable model to provide a resource vector representing a prediction of resource levels of the physical entities at a select time instant as a function of at least a) a previous resource vector representing the resource levels of the physical entities at a time instant which precedes the select time instant, and b) a behaviour selected for each of the physical entities.

FIG. 6 shows a block-diagram of a computer-implemented method 600 for training a task selection model. The method 600 may comprise, in an operation titled "INITIATING MACHINE LEARNABLE MODEL", initiating 610 a machine learnable model. The method 600 may further comprise, in an operation titled "TRAINING MACHINE LEARNABLE MODEL", training 620 the machine learnable model to select a behaviour for the physical entity from a set of behaviours. The training 620 may be performed using a self-play training technique which uses different instances of the machine learnable model in parallel simulation, and may further comprise, in an operation titled "ACCESSING RESOURCE SAFETY MODEL", accessing 630 a resource safety model which is trained for safeguarding the resource levels of the physical entities within the shared environment, and in an operation titled "CONSTRAINING BEHAVIOURS USING RESOURCE SAFETY MODEL", using the resource safety model to constrain 640 behaviours selected by the machine learnable model during the self-play to those which are predicted by the resource safety model to safeguard the resource levels of the physical entities.

It will be appreciated that, in general, the operations of method 500 of FIG. 5 and/or method 600 of FIG. 6 may be performed in any suitable order, e.g., consecutively, simultaneously, or a combination thereof, subject to, where applicable, a particular order being necessitated, e.g., by input/output relations.

The example method(s) may be implemented on a computer as a computer implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 700. Alternatively, the computer readable medium 700 may comprise transitory or non-transitory data 710 representing a trained model as described elsewhere in this specification.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those described. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device described as enumerating several means, several of these means may be embodied by one and the same item of hardware. The mere fact that certain measures are recited in separately does not indicate that a combination of these measures cannot be used to advantage.

The invention claimed is:

1. A control system configured to control physical entities to complete tasks within a shared environment, the physical entities each having a resource which is consumed during completion of tasks, the shared environment including one or more resupply points for the physical entities to resupply their resource, wherein: (i) each of the physical entities is a robotic system, and the shared environment is a shared workspace of the robotic systems, or (ii) each of the physical entities is an autonomous vehicle, and the environment is a shared operating area of the autonomous vehicles, the control system comprising:

a data storage in which a resource safety model is stored; and a processor, wherein the processor is programmed to:
obtain a behaviour-selection of a behaviour for each respective physical entity of the physical entities, the behaviour-selection being made as output of a respective task selection model that is provided for the respective physical entity and is trained to select the behaviour from a set of behaviours which includes resource behaviours associated with resupplying the resource and task behaviours associated with selecting and/or completing tasks from a shared task list, each behaviour defining a set of actions to be performed by the respective physical entity;

obtain from the data storage, and execute, the resource safety model which is trained so that the execution of the resource safety model provides a single resource vector representing a prediction of a plurality of resource levels at a select time instant in the future, the plurality of resource levels being of respective ones of the physical entities whose behaviour-selection was obtained, the provision of the single resource vector occurring by a combined input into the resource safety model of:
a previous single resource vector representing the plurality of the resource levels of the physical entities whose behaviour-selections were obtained at a time instant which precedes the selected time instant; and
all of the behaviours selected for all of the physical entities whose behaviour-selections were obtained;

determine whether the resource levels of the physical entities are each predicted to satisfy a safe resource level condition; and for a respective physical entity of the physical entities which is predicted to have a resource level not satisfying the safe resource level condition, modify or replace the behaviour selected for the respective physical entity in a manner by which the safe resource level condition is satisfied for all of the physical entities.

2. The control system according to claim 1, wherein the processor is configured to perform the modification or replacement by transmitting to the respective physical entity a different behaviour to be performed by the physical entity.

3. The control system according to claim 1, wherein the data storage further includes the respective task selection models, and the processor is configured to select the behaviours for each of the physical entities using the respective task selection models.

4. The control system according to claim 1, wherein the resource safety model is a trained deep neural network, and wherein the processor is configured to obtain the prediction of the resource levels of the physical entities using the resource safety model by:

determining a system state including at least part of a state of the physical entities and at least part of a state of the shared environment;

encoding the system state as an image;

using the image and the previous resource vector as parallel inputs into the deep neural network, the image being input to one or more convolutional layers of the deep neural network and the previous resource vector being input to a fully-connected layer of the deep neural network;

concatenating outputs of the one or more convolutional layers and the fully-connected layer; and using the concatenated outputs as input to a further fully-connected layer of the deep neural network.

5. A physical entity configured to complete tasks within an environment shared with other physical entities, the physical entity having a resource, which is consumed during completion of tasks, the shared environment including one or more resupply points for the physical entities to resupply their resource, the physical entity comprising:

a data storage including a task selection model trained for a behaviour-selection; and a processor, wherein the processor is configured to:
 obtain from the data storage, and execute, the task selection model to select a behaviour for the physical entity from a set of behaviours, the set of behaviours including resource behaviours associated with resupplying the resource and task behaviours associated with selecting and/or completing tasks from a shared task list with other physical entities, each of the behaviours defining a set of actions to be performed by the physical entity; and
 signal the selected behaviour to a control system, the control system being configured to (a) predict whether a resource level of the physical entity will satisfy a safe resource level condition at a later point in time based on execution of a resource safety model processing, in combination, an input of the selected behaviour of the physical entity and selected behaviours of the other physical entities and (b) select another behaviour for the physical entity in response to the safe resource condition being predicted to be unsatisfied;
 receive from the control system an indication of the other behaviour; and
 responsive to the receipt of the indication of the other behaviour, execute the other behaviour instead of the selected behaviour.

6. The physical entity according to claim 5, wherein the resource is:
 an energy resource for powering the physical entity; or
 a material used by the physical entity in a manufacturing process.

7. A computer-implemented method for controlling physical entities to complete tasks within a shared environment, the physical entities each having a resource which is consumed during completion of tasks, the shared environment including one or more resupply points for the physical entities to resupply their resource, wherein: (i) each of the physical entities is a robotic system, and the environment is a shared workspace of the robotic systems, or (ii) each of the physical entities is an autonomous vehicle, and the environment is a shared operating area of the autonomous vehicles, the method comprising the following steps:

obtaining a behaviour-selection of a behaviour for each respective one of the physical entities, the behaviour-selection being made as output of a respective task selection model that is provided for the respective physical entity and is trained to select the behaviour from a set of behaviours which includes resource behaviours associated with resupplying the resource and task behaviours associated with selecting and/or completing tasks from a shared task list, each of the behaviours defining a set of actions to be performed by the respective physical entity;

accessing and executing a resource safety model which is trained so that the execution of the resource safety model provides a single resource vector representing a prediction of a plurality of resource levels at a select time instant in the future, the plurality of resource levels being of respective ones of the physical entities whose behaviour-selection was obtained, the provision of the single resource vector occurring by a combined input into the resource safety model of:
 a previous single resource vector representing the plurality of the resource levels of the physical entities whose behaviour-selection was obtained at a time instant which precedes the select time instant; and
 all of the behaviours selected for all of the physical entities whose behaviour-selections were obtained;

determining whether the resource levels of the physical entities are each predicted to satisfy a safe resource level condition; and for a respective physical entity of the physical entities which is predicted to have a resource level not satisfying the safe resource level condition, modifying or replacing the behaviour selected for the respective physical entity in a manner by which the safe resource level condition is satisfied for all of the physical entities.

8. A computer-implemented method of training a resource safety model for safeguarding resource levels of physical entities completing tasks within a shared environment, wherein the physical entities each have a resource which is consumed during completion of tasks, the shared environment including one or more resupply points for the physical entities to resupply their resource, the method comprising the following steps:

initiating a machine learnable model; and training the machine learnable model to provide a single resource vector representing a prediction of a plurality of resource levels at a select time instant in the future, the plurality of resource levels being of respective ones of the physical entities for each of which a respective behaviour-selection has been obtained selecting a respective behaviour to be performed by the respective physical entity, the provision of the single resource vector occurring by a combined input into the resource safety model of:
 a previous single resource vector representing the plurality of the resource levels of the physical entities whose behaviour-selections were obtained at a time instant which precedes the select time instant; and
 all of the behaviours selected for all of the respective physical entities whose behaviour-selection were obtained, wherein the selected behaviours:
  are selected from a set of behaviours which includes resource behaviours associated with resupplying the resource and task behaviours associated with selecting and/or completing tasks from a shared task list; and
  each defines a set of actions to be performed by the respective physical entity.

9. The computer-implemented method according to claim 8, further comprising:

making the resource safety model invariant to specific types of task behaviours by, before or during the training of the machine learnable model, replacing specific types of task behaviours by a generic task behaviour.

10. The computer-implemented method according to claim 8, wherein the machine learnable model is a deep neural network, and wherein the training of the deep neural network includes:

determining a system state including at least part of a state of the physical entities and at least part of a state of the shared environment;
encoding the system state as an image;
using the image and the previous resource vector as parallel inputs into the deep neural network, the image being input to one or more convolutional layers of the deep neural network and the previous resource vector being input to a fully-connected layer of the deep neural network;
concatenating outputs of the one or more convolutional layers and the fully-connected layer; and
using the concatenated outputs as input to a further fully-connected layer of the deep neural network.

11. A computer-implemented method for training a task selection model for physical entities to complete tasks within a shared environment, the physical entities each having a resource which is consumed during completion of tasks, the shared environment including one or more resupply points for the physical entities to resupply their resource, the method comprising the following steps:
  initiating a machine learnable model; and
  training the machine learnable model to select a behaviour for each respective physical entity from a set of behaviours, the set of behaviours including resource behaviours associated with resupplying the resource and task behaviours associated with selecting and/or completing tasks from a shared task list with other physical entities;
  wherein:
    each of the behaviours defines a set of actions to be performed by the respective physical entity;
    the training is performed using a self-play training technique, which uses different instances of the machine learnable model in parallel simulations;
    the training further comprises:
      accessing a resource safety model which is trained for safeguarding the resource levels of the physical entities within the shared environment; and
      using the resource safety model to constrain behaviours selected by the machine learnable model during the self-play to those which are predicted by the resource safety model to safeguard the resource levels of the physical entities; and
    the resource safety model is trained to provide a single resource vector representing a prediction of a plurality of the resource levels at a select time instant in the future, the plurality of resource levels being of respective ones of the physical entities for each of which a respective behaviour-selection has been obtained selecting a respective behaviour to be performed by the respective physical entity, the provision of the single resource vector occurring by a combined input into the resource safety model of:
      a previous single resource vector representing the plurality of the resource levels of the physical entities whose behaviour-selections were obtained at a time instant which precedes the selected time instant; and
      all of the behaviours selected for all of the respective physical entities whose behaviour-selection were obtained.

12. The computer-implemented method according to claim 11, wherein the machine learnable model is a deep neural network.

13. A non-transitory computer-readable medium on which is stored data representing instructions that are executable by a processor and that, when executed by the processor, cause the processor to perform a method for controlling physical entities to complete tasks within a shared environment, the physical entities each having a resource which is consumed during completion of tasks, the shared environment including one or more resupply points for the physical entities to resupply their resource, wherein: (i) each of the physical entities is a robotic system, and the environment is a shared workspace of the robotic systems, or (ii) each of the physical entities is an autonomous vehicle, and the environment is a shared operating area of the autonomous vehicles, the method comprising the following steps:
  obtaining a behaviour-selection of a behaviour for each respective one of the physical entities, the behaviour-selection being made as output of a respective task selection model that is provided for the respective physical entity and is trained to select the behaviour from a set of behaviours which includes resource behaviours associated with resupplying the resource and task behaviours associated with selecting and/or completing tasks from a shared task list, each of the behaviours defining a set of actions to be performed by the respective physical entity;
  accessing and executing a resource safety model which is trained so that the execution of the resource safety model provides a single resource vector representing a prediction of a plurality of resource levels at a select time instant in the future, the plurality of resource levels being of respective ones of the physical entities whose behaviour-selection was obtained, the provision of the single resource vector occurring by a combined input into the resource safety model of:
    a previous single resource vector representing the plurality of the resource levels of the physical entities whose behaviour-selections were obtained at a time instant which precedes the select time instant; and
    all of the behaviours selected for all of the physical entities whose behaviour-selections were obtained;
  determining whether the resource levels of the physical entities are each predicted to satisfy a safe resource level condition; and
  for a respective physical entity of the physical entities which is predicted to have a resource level not satisfying the safe resource level condition, modifying or replacing the behaviour selected for the respective physical entity in a manner by which the safe resource level condition is satisfied for all of the physical entities.

14. A non-transitory computer-readable medium on which is stored data representing a resource safety model trained for safeguarding resource levels of physical entities completing tasks within a shared environment, wherein the physical entities each have a resource which is consumed during completion of tasks, the shared environment including one or more resupply points for the physical entities to resupply their resource, wherein the resource safety model is trained by:
  initiating a machine learnable model; and
  training the machine learnable model to provide a single resource vector representing a prediction of a plurality of resource levels at a select time instant in the future, the plurality of resource levels being of respective ones of the physical entities for each of which a respective behaviour-selection has been obtained selecting a respective behaviour to be performed by the respective physical entity, the provision of the single resource vector occurring by a combined input into the resource safety model of:

a previous single resource vector representing the plurality of the resource levels of the physical entities whose behaviour-selections were obtained at a time instant which precedes the select time instant; and all of the behaviours selected for all of the respective physical entities whose behaviour-selection were obtained, wherein the selected behaviours:

are selected from a set of behaviours which includes resource behaviours associated with resupplying the resource and task behaviours associated with selecting and/or completing tasks from a shared task list; and each defines a set of actions to be performed by the respective physical entity.

\* \* \* \* \*